UNITED STATES PATENT OFFICE.

BYRON B. GOLDSMITH, OF NEW YORK, N. Y., ASSIGNOR TO REDMANOL CHEMICAL PRODUCTS COMPANY, OF CHICAGO, ILLINOIS, A CORPORATION OF WEST VIRGINIA.

ARTIFICIAL RESIN AND PROCESS OF MAKING THE SAME.

1,230,829.  Specification of Letters Patent.  Patented June 19, 1917.

No Drawing.  Application filed July 27, 1910.  Serial No. 574,026.

*To all whom it may concern:*

Be it known that I, BYRON B. GOLDSMITH, a citizen of the United States, residing in the city, county, and State of New York, have invented a certain new and useful Improvement in Artificial Resin and Processes of Making the Same, of which the following is a specification.

The present invention has relation to novel compounds or materials which may be used either by molding the same into shapes required for a great variety of uses, or, by solution in an appropriate solvent they may be employed as efficient and handsome varnishes. This invention also relates to a process whereby the compounds in question may be produced.

I have discovered that, on heating together hexamethylene tetramin and either ordinary phenol ($C_6H_5OH$) cresol, or other phenols, a reaction takes place with the formation of useful products varying among themselves according to the particular phenol employed.

The compound from ordinary phenol ($C_6H_5OH$) is made by mixing phenol and hexamethylene-tetramin in a convenient vessel and heating the mixture, gradually raising the temperature. This is continued until a sample taken from the vessel solidifies on cooling, when the mixture is poured out and allowed to cool. The compound thus formed has an amber color and resembles resin in appearance. It may be powdered and pressed into convenient shapes when heated. It may, on the other hand, be dissolved in proper solvents, as for instance acetone, and may be used as a varnish. When subjected to heat and pressure in a mold, this compound becomes harder and more insoluble.

The heat required for causing the reaction to start need not be higher than the boiling point of water for some of the phenols. For others a high temperature is required, particularly if of solid form and used dry instead of in solution.

For instance, if ordinary phenol ($C_6H_5OH$) is heated with hexamethylene-tetramin on the water bath the two easily react, because phenol is liquid at the temperature of boiling water.

The proportions in which the ingredients are mixed will vary according to the particular phenol used, and the most suitable proportion for each phenol and for the particular end in view can readily be determined by experiment.

Good results may be obtained by mixing three or four parts by weight of either true phenol or cresol with one part by weight of hexamethylene-tetramin. Four parts by weight of the phenolic body to one part by weight of the methylene-amin body corresponds to about six mols of the phenolic body to one mol of the methylene-amin body. It will be noted that such proportions furnish at least substantially one phenolic group of the phenolic body to each methylene group of the active methylene body. These proportions are given as examples, as I find that the proportions may vary within quite a wide range. As indicated above, the condensation product resembles resin, and is amorphous or non-crystalline. The re-action is anhydrous, that is, there is no water formed in the re-action. On the other hand, ammonia is given off copiously during the re-action, and it is an advantage of the process that formaldehyde need not be used in forming the soluble and fusible resin, and no formaldehyde is formed during the re-action. Also, as indicated above, the condensation product may be dissolved in proper solvents, when taken at the proper stage. When subjected to further heat treatment, however, the compound becomes harder and more insoluble, and in the final stage becomes infusible and practically insoluble in known solvents. It is a further advantage of the process that the materials may be readily measured in definite proportions, and that the proportion of the phenolic groups to the methylene groups may be maintained during the condensation process. Thus, there is no dilution due to the formation of water (none being formed), and there is no loss of methylene groups, as may be the case where formaldehyde is used. It is preferred to carry on the re-actions substantially in the absence of water. By so doing, I obviate the necessity of eliminating both the water of solution and the water of formation incident to the well-known wet formaldehyde process. Commercially obtainable materials usually contain some water as an impurity, the percentage of water being so small, however, as to be negligible.

It is an economic advantage of my process that, during the reaction, ammonia is given off copiously and that this can be easily collected and used in preparing a fresh quantity of hexamethylene-tetramin.

The foregoing detailed description has been given for clearness of understanding, and no unnecessary limitation should be understood therefrom, but the appended claims should be construed as broadly as permissible in view of the prior art. Any suitable hydroxy aromatic compound, such as phenol or its homologues, and any suitable equivalent active methylene body may be employed as substitutes for the preferred materials mentioned.

What I claim is—

1. A composition of matter of the character set forth, comprising the product of anhydrous reaction directly between hexamethylenetetramin and a hydroxy aromatic compound of the character set forth, subjected to the action of heat, the substances compounded in such proportions as to furnish at least substantially one phenolic group of the hydroxy aromatic compound to each methylene group of the hexamethylenetetramin.

2. An amorphous composition of matter having qualities of the character set forth and containing nitrogen and produced by direct anhydrous combining of hexamethylenetetramin and a phenolic body of the character set forth, substantially in the absence of water, employing such proportions as to furnish at least substantially one phenolic group to each methylene group.

3. An anhydrous process of producing a condensation product, which consists in producing an anhydrous reaction, substantially in the absence of water, in a mixture which includes an active methylene body and a phenolic body, employing such proportions and such application of heat as to produce a non-crystalline condensation product.

4. An anhydrous process of producing a condensation product, which consists in producing an anhydrous reaction, substantially in the absence of water, in a mixture which includes a phenolic body and hexamethylenetetramin, employing such proportions and such conditions of treatment, including the application of heat, as to produce a fusible non-crystalline condensation product.

5. An anhydrous process of producing a condensation product, which consists in producing an anhydrous reaction, substantially in the absence of water, in a mixture which includes a phenolic body and a methyleneamin body which normally exists as a solid, employing such proportions and such conditions of treatment, including such application of heat, as to produce a final amorphous, infusible condensation product.

6. An anhydrous process of producing a condensation product, which consists in heating a mixture which comprises a phenolic body and hexamethylenetetramin, substantially free from water, employing such proportions and such application of heat as to produce a non-crystalline condensation product.

7. An anhydrous process of producing a fusible condensation product, which consists in producing an anhydrous reaction, substantially in the absence of water, in a mixture which includes a phenolic body and an active methylene body which normally exists as a solid, employing such proportions and such application of heat as to produce a fusible, non-crystalline condensation product, and introducing a solvent as one step in the process.

8. An anhydrous process of producing a condensation product, which consists in producing an anhydrous reaction, substantially in the absence of water, in a mixture which comprises a hydroxy-aromatic compound of the character set forth and a methylene body of the character set forth, compounded in such proportions as to furnish approximately one methylene group to each phenol group, employing such heat treatment as to eliminate a large percentage of nitrogen in the form of a nitrogen compound formed during the reaction and produce a non-crystalline condensation product.

9. An anhydrous process of producing a condensation product, which consists in producing an anhydrous reaction, substantially in the absence of water, in a mixture which comprises a phenol and hexamethylenetetramin compounded in such proportions as to furnish at least substantially one phenolic group to each methylene group, employing such heat treatment as to produce a non-crystalline condensation product.

10. A non-crystalline condensation product of the character set forth, comprising the product of anhydrous reaction, under the application of heat and substantially in the absence of water, in a mixture comprising a phenolic body of the character set forth and an active methylene body, taken in such proportions and subjected to such heat treatment as to produce said non-crystalline condensation product.

11. An amorphous composition of matter, comprising the product of anhydrous reaction substantially in the absence of water in a mixture comprising a phenolic body of the character set forth and a methyleneamin body, taken in such proportions and subjected to such heat treatment as to produce a final infusible product.

12. A composition of matter comprising the product of anhydrous reaction under the application of heat and substantially in the absence of water, in a mixture comprising a phenol and hexamethlyenetetramin, taken in such proportions and subjected to such heat treatment as to produce a non-crystalline condensation product.

13. A non-crystalline condensation product, comprising the product of anhydrous reaction under the application of heat and substantially in the absence of water, in a mixture comprising a phenolic body of the character set forth and hexamethylenetetramin, taken in such proportions as to afford at least substantially one phenolic group to each methylene group.

14. A process of producing a condensation product, which consists in producing an anhydrous reaction in the absence of a catalyzer between a methylene-amin body and a phenolic body with the evolution of ammonia, employing such proportions and such application of heat as to produce a non-crystalline condensation product.

15. A process of producing a condensation product, which consists in producing an anhydrous reaction in the absence of a catalyzer between a methylene-amin body and a phenolic body with the evolution of ammonia, employing such proportions as to afford at least substantially one methylene group to one phenolic group and such application of heat as to produce a non-crystalline condensation product.

16. A process of producing a condensation product which consists in producing an anhydrous reaction in the absence of a catalyzer between hexamethylenetetramin and a phenolic body with the evolution of ammonia, employing such proportions and such application of heat as to produce a non-crystalline condensation product.

17. A process of producing a condensation product, which consists in producing an anhydrous re-action in the absence of a catalyzer between hexamethylenetetramin and a phenolic body with the evolution of ammonia, employing such proportions as to afford at least substantially one methylene group to one phenolic group and such application of heat as to produce a non-crystalline condensation product.

18. A non-crystalline condensation product of the character set forth, comprising the product of anhydrous reaction, with evolution of ammonia, in a mixture comprising a phenolic body of the character set forth and a methylene-amin body, taken in such proportions and subjected to such heat treatment in the absence of a catalytic agent as to produce said non-crystalline condensation product.

19. A non-crystalline condensation product of the character set forth, comprising the product of anhydrous reaction, with evolution of ammonia, in a mixture comprising a phenolic body of the character set forth, and hexamethylenetetramin taken in such proportions and subjected to such heat treatment in the absence of a catalytic agent as to produce said non-crystalline condensation product.

BYRON B. GOLDSMITH.

Witnesses:
C. E. FINN,
W. H. KULKA.